(12) United States Patent
Park et al.

(10) Patent No.: US 8,330,712 B2
(45) Date of Patent: Dec. 11, 2012

(54) ELECTROPHORETIC DISPLAY DEVICE INCLUDING BUFFER PATTERN IN NON-DISPLAY REGION

(75) Inventors: Sung-Jin Park, Daegu (KR); Seung-Chul Kang, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 760 days.

(21) Appl. No.: 12/481,990

(22) Filed: Jun. 10, 2009

(65) Prior Publication Data

US 2010/0156779 A1 Jun. 24, 2010

(30) Foreign Application Priority Data

Dec. 22, 2008 (KR) .......................... 10-2008-0131127
Mar. 3, 2009 (KR) .......................... 10-2009-0017903

(51) Int. Cl.
*G09G 3/34* (2006.01)
*G02B 26/00* (2006.01)
*H01L 21/00* (2006.01)
(52) U.S. Cl. ........................... 345/107; 359/296; 438/29
(58) Field of Classification Search ................... 345/107
See application file for complete search history.

(56) References Cited

U.S. PATENT DOCUMENTS

| | | | | |
|---|---|---|---|---|
| 5,867,236 | A * | 2/1999 | Babuka et al. | 349/73 |
| 6,493,047 | B2 * | 12/2002 | Ha | 349/40 |
| 2004/0263948 | A1* | 12/2004 | Lee et al. | 359/296 |
| 2005/0206798 | A1* | 9/2005 | Kim | 349/54 |
| 2008/0043318 | A1* | 2/2008 | Whitesides et al. | 359/296 |
| 2008/0110862 | A1* | 5/2008 | Kim et al. | 216/83 |
| 2008/0129945 | A1* | 6/2008 | Kim | 349/153 |
| 2008/0230767 | A1* | 9/2008 | Jung et al. | 257/40 |
| 2008/0259021 | A1* | 10/2008 | Choi et al. | 345/107 |
| 2008/0278435 | A1* | 11/2008 | Song et al. | 345/107 |
| 2010/0001276 | A1* | 1/2010 | Kim et al. | 257/59 |
| 2010/0264817 | A1* | 10/2010 | Bouten et al. | 313/512 |

* cited by examiner

*Primary Examiner* — Alexander S Beck
*Assistant Examiner* — Karin Kiyabu
(74) *Attorney, Agent, or Firm* — Morgan, Lewis & Bockius LLP (57) ABSTRACT

An electrophoretic display device includes a first substrate having a display region and a non-display region at a periphery of the display region, the display region including a pixel region; gate and data lines on the first substrate and in the display region, the gate and data lines crossing each other to define the pixel region; a gate link line connected to the gate line and positioned in the non-display region; a thin film transistor connected to the gate and data lines and positioned in the pixel region, the thin film transistor including a gate electrode, a gate insulating layer, a semiconductor layer, a source electrode and a drain electrode; a passivation layer of an organic insulating material over the thin film transistor and in the display region, the passivation layer having a first thickness and including a drain contact hole exposing the drain electrode; a buffer pattern formed of the same material and having the same thickness as the passivation layer, the buffer pattern positioned in the non-display region; a pixel electrode positioned in the pixel region and on the passivation layer, the pixel electrode connected to the drain electrode through the drain contact hole; and an electrophoretic film on the pixel electrode and covering an entire surface of the display region, an end of the electrophoretic film positioned on the buffer pattern.

12 Claims, 7 Drawing Sheets

ELECTROPHORETIC DISPLAY DEVICE INCLUDING BUFFER PATTERN IN NON-DISPLAY REGION

The present invention claims the benefit of Korean Patent Application Nos. 10-2008-0131127 and 10-2009-0017903, filed in Korea on Dec. 22, 2008 and Mar. 3, 2009, respectively, all of which are hereby incorporated by reference in their entirety.

BACKGROUND OF THE INVENTION

1. Field of the Invention

The present invention relates to an electrophoretic display device, and more particularly, to an electrophoretic display device being capable of preventing a defect, for example, a crack, on an electric signal line or an electrode, and a method of fabricating the same.

2. Discussion of the Related Art

Until recently, display devices have typically included liquid crystal display (LCD) devices, plasma display panels (PDPs) and organic electro-luminescence displays (OLEDs). However, to meet consumer's requirements, various display devices are introduced.

Particularly, properties of a light weight, a thin profile, a high efficiency and a full color moving image displaying are required in the display device. To meet the properties, an electrophoretic display device is suggested. The electrophoretic display device uses a phenomenon that charged particles move to an anode or a cathode. The electrophoretic display device has advantages in a contrast ratio, a response time, a full color display, a cost, mobility and so on. Different from the LCD device, the electrophoretic display device does not require a polarizer, a backlight unit, a liquid crystal layer and so on. Accordingly, the electrophoretic display device has an advantage in production costs.

Figure 1:
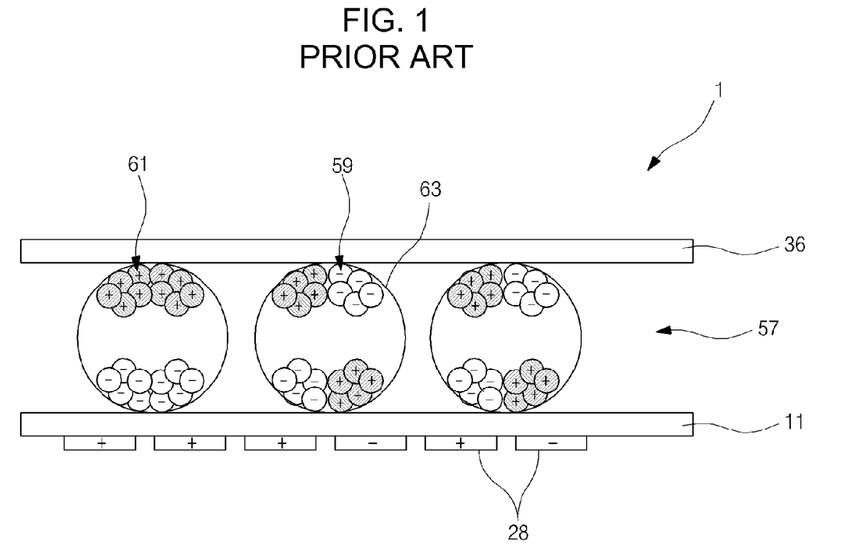
FIG. 1 is a cross-sectional view illustrating a driving method for the related art electrophoretic display device.

FIG. 1 is a cross-sectional view illustrating a driving method for the related art electrophoretic display device. In FIG. 1, the related art electrophoretic display device 1 includes a first substrate 11, a second substrate 36 and an ink layer 57 interposed therebetween. The ink layer 57 includes capsules 63, and each capsule 63 has a plurality of white-dyed particles 59 and a plurality of black-dyed particles 61 therein. The white-dyed and black-dyed particles 59 and 61 are negatively and positively charged by a condensation polymerization reaction, respectively.

A plurality of pixel electrodes 28, which are connected to a thin film transistor (not shown), are disposed under the first substrate 11 and in each pixel region (not shown). Each of the pixel electrodes 28 has a positive voltage or a negative voltage. When the capsules having various sizes are formed, a filtering process is performed to obtain capsules having a uniform size.

When a positive or negative voltage is applied to the ink layer 54, the white-dyed particles 59 and the black-dyed particles 61 in the capsules 63 move according to polarities of the applied voltage. When the black-dyed particles 61 move upward, a black color is displayed. When the white-dyed particles 59 move upward, a white color is displayed.

Figure 2:
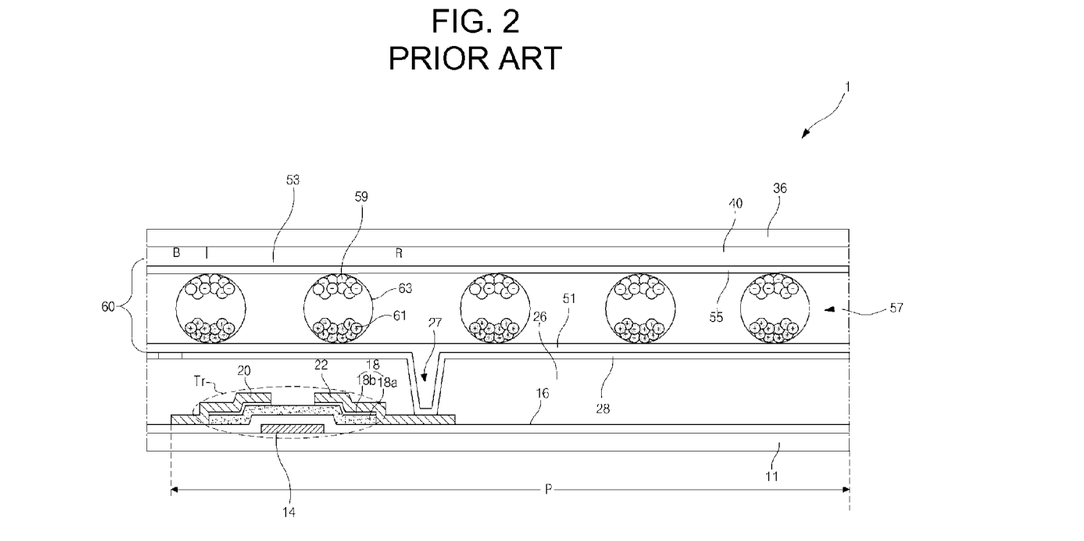
FIG. 2 is a schematic cross-sectional view of the related art electrophoretic display device.

FIG. 2 is a schematic cross-sectional view of the related art electrophoretic display device. In FIG. 2, the related art electrophoretic display device 1 includes a first substrate 11, a second substrate 36 and an electrophoretic film 60 interposed therebetween. The electrophoretic film 60 includes an ink layer 57, first and second adhesive layers 51 and 53, and a common electrode 55. The ink layer 57 is disposed between the first and second adhesive layers 51 and 53. Each of the first and second adhesive layers 51 and 53 is formed of a transparent material. The common electrode 55 is disposed under the second adhesive layers 53 to face the ink layer 57. The ink layer 57 includes capsules 63, and each capsule 63 has a plurality of white-dyed particles 59 and a plurality of black-dyed particles 61 therein. The white-dyed and black-dyed particles 59 and 61 are negatively and positively charged, respectively.

The second substrate 36 may be formed of a transparent plastic or a glass, and the first substrate 11 may be formed of an opaque stainless steel. The first substrate 11 may be also formed of a transparent plastic or a glass. A color filter layer 40 of red (R), green (G) and blue (B) colors sub-color filters is formed under an entire surface of the second substrate 36. On the first substrate 11, a gate line (not shown) and a data line (not shown) are formed. The gate and data lines cross each other to define a pixel region P. A thin film transistor (TFT) Tr is formed at a crossing portion of the gate and data lines. The TFT Tr is disposed in each pixel region P. The TFT Tr includes a gate electrode 14, a gate insulating layer 16, a semiconductor layer 18 including an active layer 18a and an ohmic contact layer 18b, a source electrode 20 and a drain electrode 22. The gate and source electrodes are connected to the gate and data lines, respectively, and the gate insulating layer 16 covers the gate electrodes 14. The semiconductor layer 18 is disposed on the gate insulating layer 16 and overlaps the gate electrode 14. The source and drain electrodes 20 and 22 are disposed on the semiconductor layer 18 and spaced apart from each other.

A passivation layer 26 including a drain contact hole 27 is formed over the TFT Tr. The drain contact hole 27 exposes a portion of the drain electrode 22. A pixel electrode 28 is disposed on the passivation layer 26 and in each pixel region P. The pixel electrode 28 is connected to the drain electrode 22 through the drain contact hole 27. The pixel electrode 28 may be formed of a transparent conductive material, for example, indium-tin-oxide (ITO) or indium-zinc-oxide (IZO).

The electrophoretic display device 1 having the above elements uses ambient light, for example, natural light or room electric light, as a light source. The electrophoretic display device 1 can display images by inducing a position change of the white-dyed particles 59 and the black-dyed particles 61 in the capsule 63 depending on a polarity of a voltage applied to the pixel electrode 28.

A fabricating process for the electrophoretic display device may be classified as an array process and a film laminating process. The array substrate 11, where array elements, for example, the TFT Tr, the pixel electrode 28, and so on, are formed, is fabricated in the array process. In the film laminating process, an electrophoretic film is attached onto the array substrate 11 such that the electrophoretic display device 1 is manufactured.

Figure 3:
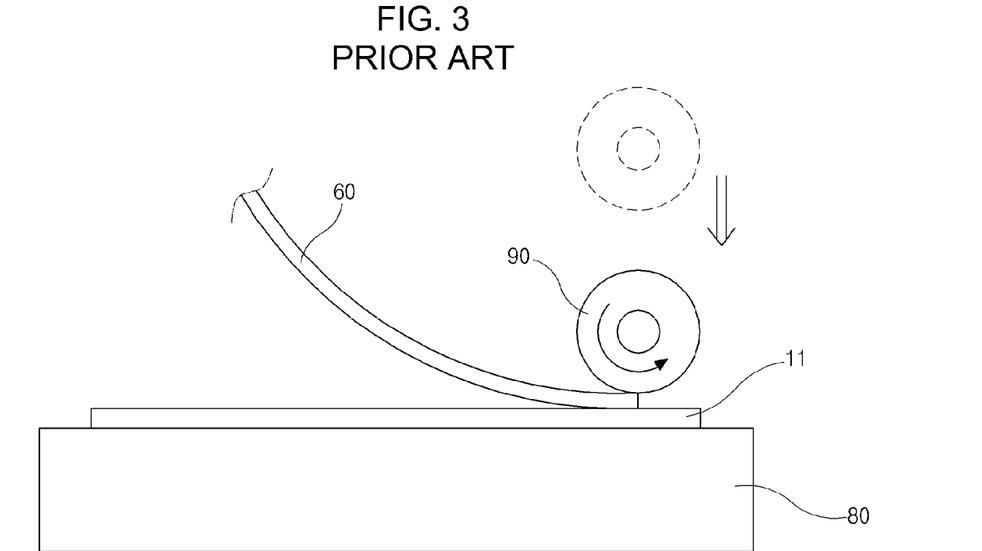
FIG. 3 shows a film laminating process for fabricating the related art electrophoretic display device.
Figure 4:
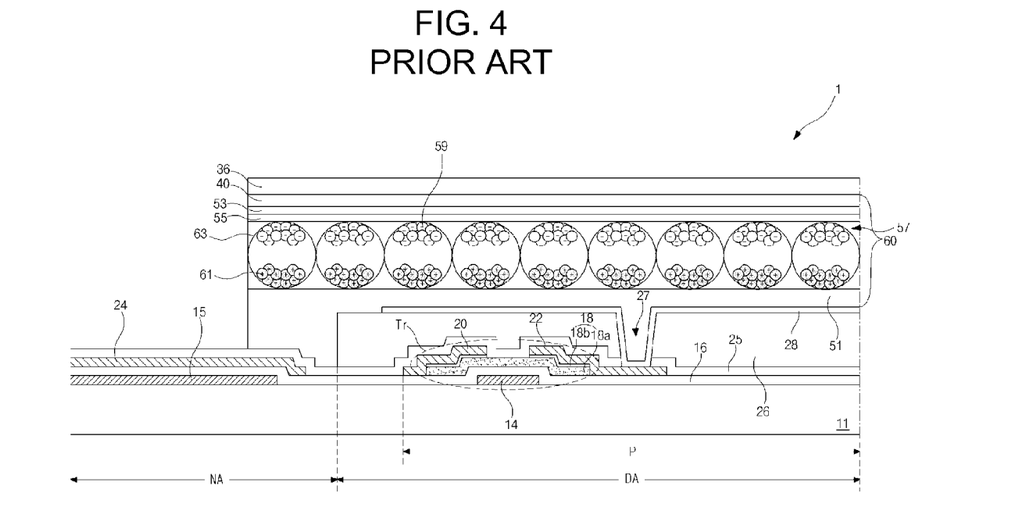
FIG. 4 is a cross-sectional view of the related art electrophoretic display device including a display region and a non-display region.

FIG. 3 shows a film laminating process for fabricating the related art electrophoretic display device, and FIG. 4 is a cross-sectional view of the related art electrophoretic display device including a display region and a non-display region.

Referring to FIGS. 3 and 4, after forming the array substrate 11, where array elements, for example, the TFT Tr, the pixel electrode 28, and so on, are formed, an electrophoretic film 60 including an ink layer 57 is attached on a display region DA and a portion of a non-display region NA of the array substrate 11 by the film laminating process. Although not shown, in the non-display region NA, a gate and data pad electrodes for connection to an external driving circuit board (not shown) for driving the TFT Tr and the pixel electrode 28 in the display region DA, a gate link line 24 for connecting the gate pad electrode to the gate line, a data link line for connecting the data pad electrode to the data line, a common connection line 15 for applying a common voltage, a low gate voltage line for applying a gate low voltage, and an electrostatic preventing circuit are formed. Since there is no element for directly participating in an image displaying and the gate and data pad electrodes should be exposed for connection to the external driving circuit board, it is not required to form the electrophoretic film 60 in the non-display region NA. However, considering mis-aligning, the electrophoretic film 60 is formed on a portion of the non-display region NA adjacent to the display region DA.

Unfortunately, there are some problems. Since the gate link line 24 is formed at the starting point of attaching the electrophoretic film 60, there is strong stress on the gate link line 24 because of a roll 90 for attaching the electrophoretic film 60 onto the array substrate 11. Or, when there are particles in an end side of the electrophoretic film 60, there are cracks on the gate link line 24, an electrode of a driving element in the display region DA, or the gate insulating layer 16 under the gate link line 24 because of stress resulted from the particles.

If there is strong stress on the gate link line 24 during the film laminating process, the gate link line 24 may be perfectly cut such that a signal from the external driving circuit board can not be applied to the gate line connected to the gate link line 24. In addition, an insulating property of the gate insulating layer 16 between the gate link line 24, on which the cracks are formed, and another electric line, for example, the common connection line 15, the low gate voltage line (not shown), under the gate insulating layer is destructed such that an electric shortage problem is caused. Namely, the array substrate can not be driven.

Referring back to FIG. 4, a passivation layer 26, which has a relatively high thickness of about 2 to 4 micrometers and is made of an organic insulating material, is formed in the display region DA, while there is no passivation layer in the non-display region NA.

To minimize these problems, it is possible for the elements, for example, the electrostatic preventing circuit, except the link line to be formed in an outer portion of the non-display region NA. Unfortunately, this solution causes an increase of a processing margin and a size of the non-display region NA. It is against the tendency for decreasing a size of the non-displaying region NA. In addition, since the link line should be formed to be extended from the display region DA to the non-display region NA, there is a limitation to preventing these problems.

SUMMARY OF THE INVENTION

Accordingly, the present invention is directed to an electrophoretic display device and method of fabricating the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an electrophoretic display device includes a first substrate having a display region and a non-display region at a periphery of the display region, the display region including a pixel region; gate and data lines on the first substrate and in the display region, the gate and data lines crossing each other to define the pixel region; a gate link line connected to the gate line and positioned in the non-display region; a thin film transistor connected to the gate and data lines and positioned in the pixel region, the thin film transistor including a gate electrode, a gate insulating layer, a semiconductor layer, a source electrode and a drain electrode; a passivation layer of an organic insulating material over the thin film transistor and in the display region, the passivation layer having a first thickness and including a drain contact hole exposing the drain electrode; a buffer pattern formed of the same material and having the same thickness as the passivation layer, the buffer pattern positioned in the non-display region; a pixel electrode positioned in the pixel region and on the passivation layer, the pixel electrode connected to the drain electrode through the drain contact hole; and an electrophoretic film on the pixel electrode and covering an entire surface of the display region, an end of the electrophoretic film positioned on the buffer pattern.

In another aspect, a method of fabricating an electrophoretic display device includes forming a gate line on a first substrate having a display region and a non-display region at a periphery of the display region, wherein the gate line is positioned in the display region; forming a gate insulating layer covering the display region and the non-display region on the gate line; forming a data line on the gate insulating layer and in the display region and a gate link line on the gate insulating layer and in the non-display region, the data line crossing the gate line to define a pixel region, the gate link line connected to the gate line; forming a thin film transistor in the pixel region, the thin film transistor including a gate electrode under the gate insulating layer, a semiconductor layer on the gate insulating layer and source and drain electrodes on the semiconductor layer; forming a passivation layer of an organic insulating material over the thin film transistor and in the display region, the passivation layer having a first thickness and including a drain contact hole exposing the drain electrode; forming a buffer pattern formed of the same material and having the same thickness as the passivation layer, the buffer pattern positioned in the non-display region; forming a pixel electrode positioned in the pixel region and on the passivation layer, the pixel electrode connected to the drain electrode through the drain contact hole; disposing an electrophoretic film over the first substrate including the pixel electrode, wherein an end of the electrophoretic film corresponds to the buffer pattern; and attaching the electrophoretic film on the pixel electrode and the buffer pattern by pressing the electrophoretic film onto the pixel electrode and the buffer pattern using a roll in a laminating apparatus.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 5:
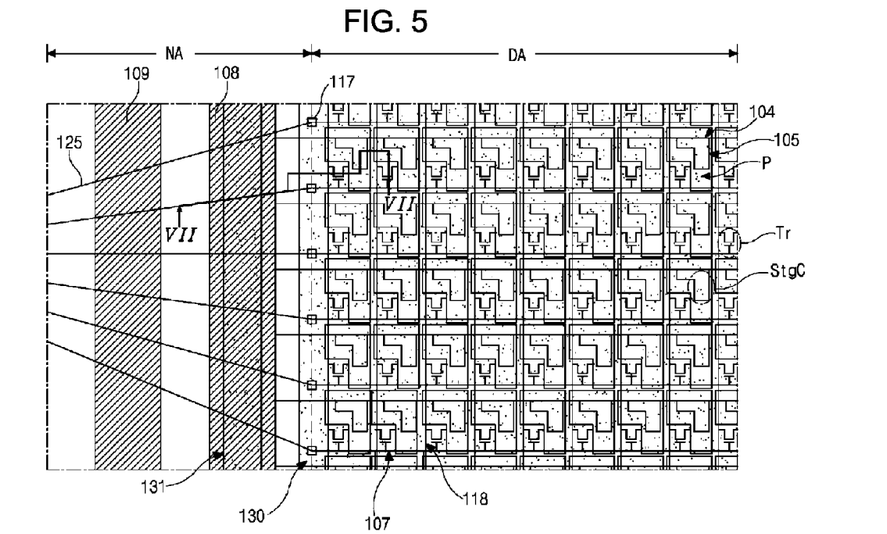
FIG. 5 is a plan view of an electrophoretic display device including a portion of a display region and a portion of a non-display region according to the present invention.
Figure 6:
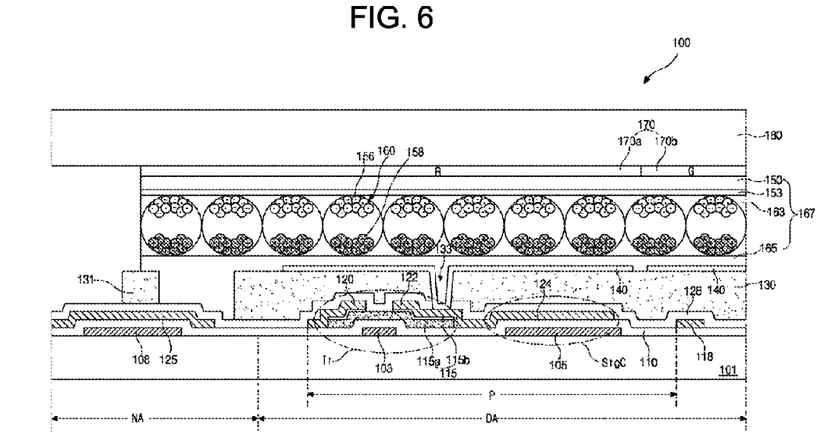
FIG. 6 is a cross-sectional view taken along the line VII-VII in FIG. 5.

FIG. 5 is a plan view of an electrophoretic display device including a portion of a display region and a portion of a non-display region according to the present invention, and FIG. 6 is a cross-sectional view taken along the line VII-VII in FIG. 5.

As shown in FIGS. 5 and 6, an electrophoretic display device 100 includes an array substrate 101 and an electrophoretic film 167 attached on the array substrate 101. The array substrate 101 has a display region DA for displaying images and a non-display region NA at a periphery of the display region DA. A plurality of pixel regions P are defined in the display region DA, and a gate pad region and a data pad region are defined in the non-display region NA.

In the display region DA, a plurality of gate lines 107 and a plurality of data lines 118 are formed with a gate insulating layer 110 therebetween. The gate lines 107 and data lines 118 cross each other such that the pixel regions P are defined in the display region DA. In the non-display region NA, a gate link line 125 connected to the gate line 107 through a link contact hole 117, a gate pad electrode (not shown) at an end of the gate link line 125, a data link line (not shown) connected to the data line 118, a data pad electrode (not shown) at an end of the data link line, a common connection line 108 for applying a common voltage to a plurality of common lines 104 in the display region DA, and a low gate voltage line 109 for applying a low gate voltage are formed.

The common lines 104 and the common connection line 108 are disposed at the same layer, and the common lines 104 are branched from the common connection line 108. The common lines 104 and the common connection line 108 are formed of the same material and at the same layer as the gate line 107. On the other hand, the gate link line 125 crosses the common connection line 108. Accordingly, the gate link line 125 is formed at a different layer than the gate line 107 to prevent an electrical shortage with the common connection line 108. FIG. 6 shows the gate link line 125 formed on the gate insulating layer 110. Since the data line 118 are formed of a different layer than the common connection line 108, an electrical shortage between the data link line and the common connection line 108 is not generated. Accordingly, the data link line is formed at the same layer as the data line 118.

A thin film transistor (TFT) Tr as a switching element is formed in each pixel region P. The TFT connected to the gate line 107 and the data line 118 includes a gate electrode 103, the gate insulating layer 110, a semiconductor layer 115 including an active layer 115a of intrinsic amorphous silicon and an ohmic contact layer 115b of impurity-doped amorphous silicon, a source electrode 120 and a drain electrode 122. Although not shown, a plurality of driving TFTs for driving an electrostatic preventing circuit are formed in the non-display region NA.

The common line 104 is formed in each pixel region P and disposed under the gate insulating layer 110. The common line 104 is parallel to the gate line 107. The drain electrode 122 extends to overlap a portion of the common line 104. An overlapped portion of the common line 104 serves as a first storage electrode 105, an overlapped portion of the drain electrode 122 severs as a second storage electrode 124, and the gate insulating layer 110 between the first and second storage electrodes 105 and 124 serves as a dielectric material layer. As a result, a storage capacitor StgC including the first and second storage electrodes 105 and 124 and the gate insulating layer 110 are formed.

A first passivation layer 128 of an inorganic insulating material is formed on the TFTs Tr. Although not shown, for connection of the driving TFTs, a plurality of contact holes exposing a gate electrode, a source electrode and a drain electrode of the driving TFTs are formed in the first passivation layer 128. In addition, a gate pad contact hole corresponding to the gate pad electrode and a data pad contact hole corresponding to the data pad electrode are formed in the first passivation layer 128.

A second passivation layer 130 of an organic insulating material is formed on the first passivation layer 128 in the display region DA. The second passivation layer 130 has a thickness of about 2 to about 4 micrometers. A drain contact hole 133 exposing the drain electrode 122 of the TFT Tr in each pixel region P is formed through the first and second passivation layers 128 and 130.

A buffer pattern 131 of the same material as the second passivation layer 130 is formed in the non-display region NA. The buffer pattern 131 also has a thickness of about 2 to about 4 micrometers. The buffer pattern 131 is positioned at a start portion of the electrophoretic film 167 such that an impact resulted from a roll during the film laminating process is diminished. The buffer pattern 131 has an enough width considering an align margin of the film laminating process. Since the align margin is below 0.5 mm, the buffer pattern 131 has a width of about 0.5 to about 1 mm. FIGS. 5 and 6 show the buffer pattern 131 spaced apart from the second passivation layer 130. However, the buffer pattern 131 can be extended from the second passivation layer 130. In addition, although FIG. 5 shows the buffer pattern 131 extends along the data line 118, the buffer pattern 131 may have an island shape. The island shape buffer pattern 131 may correspond to the gate link line 125 or a space between adjacent gate link lines 125.

Since the buffer pattern 131 is formed of an organic insulating material having a flexible property, an impact resulted from a roll during the film laminating process is diminished such that defects, for example, cracks, on the gate link line 125, an electrode of the driving TFT (not shown), and the gate insulating layer 110 are not generated. In addition, even if there are particles on the electrophoretic film 167, there is no damage on the gate link line 125 because of the buffer pattern 131 has a relatively high thickness and a flexible property. Accordingly, an electrical shortage problem between the gate link line and the common connection line is not generated.

The electrophoretic film 167 is attached on the array substrate 101. The electrophoretic film 167 includes a base film 150, an ink layer 163, an adhesive layer 165 and a common electrode 153. The ink layer 163 includes a plurality of capsules 160, and each capsule 160 has a plurality of white-dyed particles 156 and a plurality black-dyed particles 158 therein. The white-dyed and black-dyed particles 156 and 158 are negatively and positively charged, respectively. The adhesive layer 165 is disposed under the ink layer 163 and formed of a transparent material. The common electrode 153 is disposed between the ink layer 163 and the base film 150 and formed of a transparent conductive material.

A color filter layer 170 including a red color filter pattern 170a, a green color filter pattern 170b and a blue color filter pattern (not shown) is disposed over the electrophoretic film 167. In addition, a protective substrate 180 is formed on the color filter layer 170.

Hereinafter, a fabricating method is explained with reference to FIG. 7A to 7K. FIGS. 7A to 7K are cross-sectional views illustrating a fabricating process of a pixel region and a portion, where an end of an electrophoretic film is disposed, of an electrophoretic display device according to the present invention. For convenience of explanation, a region, where a switching TFT will be formed, is defined as a switching region TrA.

Figure 7A:
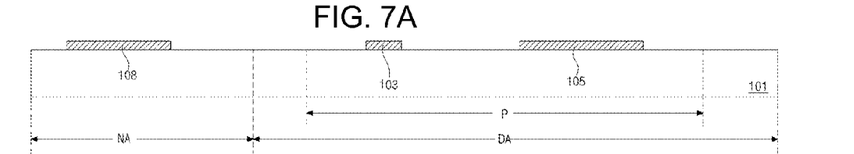
FIGS. 7A to 7K are cross-sectional views illustrating a fabricating process of a pixel region and a portion, where an end of an electrophoretic film is disposed, of an electrophoretic display device according to the present invention.

In FIG. 7A, a gate line (not shown), a common line (not shown), a gate electrode 103, a first storage electrode 105, a common connection line 108 and a low gate voltage line (not shown) are formed on a substrate 101 by depositing and patterning a first metal layer (not shown) using a mask process. The first metal layer may be formed of a first metallic material, such as aluminum (Al), Al alloy (AlNd), copper (Cu), Cu alloy, chromium (Cr) or titanium (Ta) alloy. The mask process includes a step of coating a photoresist (PR) layer, a step of exposing the PR layer using a mask, a step of developing the PR layer to form a PR pattern, a step of etching a material layer using the PR pattern as an etching mask, and a step of stripping the PR pattern. In addition, although not shown, a driving gate electrode of a driving TFT for driving an electrostatic preventing circuit is formed in the non-display region.

The common line is parallel to the gate line. The gate electrode 103 is positioned in the switching region TrA. The first storage electrode 105 may be branched from the common line or a portion of the common line. The common connection line 108 is positioned in the non-display region NA and connected to the common line. The low gate voltage line is spaced apart from the common connection line 108.

FIG. 7A shows the first metal layer of a single layer. However, the first metal layer may be a double-layered structure, for example, a lower layer of AlNd and an upper layer of molybdenum (Mo) or a lower layer of Ti alloy and an upper layer of Cu. Namely, each of the gate line, the gate electrode 103, the first storage electrode 105, the common line, the common connection line 108 and the driving gate electrode may have a double-layered structure.

Figure 7B:
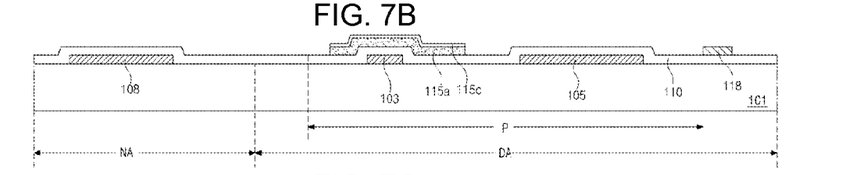

In FIG. 7B, a gate insulating layer 110 is formed on the gate line, the gate electrode 103, the first storage electrode 105, the common line, the common connection line 108 and the driving gate electrode by depositing an inorganic insulating material, such as, silicon oxide or silicon nitride.

Sequentially, an intrinsic amorphous silicon layer (not shown) and an impurity-doped amorphous silicon layer (not shown) are stacked on the gate insulating layer 110 by depositing intrinsic amorphous silicon and impurity-doped amorphous silicon. Then, the impurity-doped amorphous silicon layer and the intrinsic amorphous silicon layer are patterned by a mask process such that an active layer 115a and an impurity-doped amorphous silicon pattern 115c on the active layer 115a are formed in the switching region TrA. The active layer 115a is formed of intrinsic amorphous silicon and corresponds to the gate electrode 103. At the same time, although not shown, a driving active layer and a driving impurity-doped amorphous silicon pattern are formed over the driving gate electrode in the non-display region NA. The driving active layer is formed of the same material and has the same shape as the active layer 115a, and the driving impurity-doped amorphous silicon pattern is formed of the same material and has the same shape as the impurity-doped amorphous silicon pattern 115c. The gate insulating layer 110 is also patterned such that a link contact hole (not shown) exposing an end of the gate line is formed for connection the gate line with a gate link line and the gate pad electrode, which will be formed.

Figure 7C:
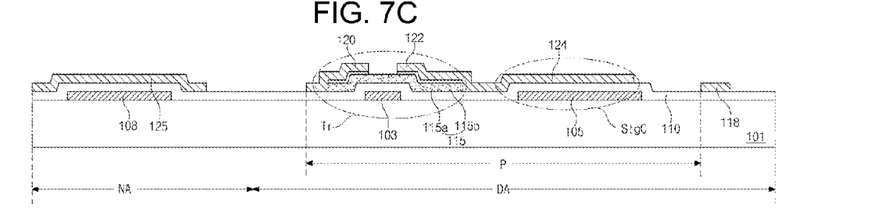

Next, in FIG. 7C, a second metal layer (not shown) is formed on the active layer 115a and the impurity-doped amorphous silicon pattern 115c (of FIG. 7B) by depositing a second metallic material, such as Mo, Cu, Ti alloy or AlNd. The second metal layer has a single layer of one of Mo, Cu, Ti alloy or AlNd. However, the second metal layer may have a double-layered structure or a triple-layered structure by sequentially depositing two or three of Mo, Cu, Ti alloy and AlNd. For example, the second metal layer includes a Ti alloy layer and a Cu layer or a Mo layer, an AlNd layer and a Mo layer.

The second metal layer is patterned by a mask process such that a data line 118 is formed in the display region DA. The data line 118 crosses the gate line such that the pixel region P is defined in the display region DA. At the same time, a data link line (not shown) connected to the data line 118, a data pad electrode (not shown) at an end of the data link line, a gate link line 125 contacting the gate line through the link contact hole, and a gate pad electrode (not shown) at an end of the gate link line 125 are formed in the non-display region NA. In addition, a source electrode 120 and a drain electrode 122 is formed in the switching region TrA, and a second storage electrode 124 is formed to overlap the first storage electrode 105. The source electrode 120 is connected to the data line 118 and spaced apart from the drain electrode 122. The source and drain electrodes 120 and 122 are positioned on the impurity-doped amorphous silicon pattern 115c such that a portion of the impurity-doped amorphous silicon pattern 115c is exposed through a space between the source and drain electrodes 120 and 122. The second storage electrode 124 extends from the drain electrode 122 and overlaps the first storage electrode 105. The first storage electrode 105, the second storage electrode 124, and the gate insulating layer therebetween constitute a storage capacitor StgC.

Although not shown, a driving source electrode and a driving drain electrode are formed on the driving impurity-doped amorphous silicon pattern in the non-display region NA.

Next, an exposed portion of the impurity-doped amorphous silicon pattern 115c (of FIG. 7B) is removed by a dry-etching such that the active layer 115a is exposed through the space between the source and drain electrodes 120 and 122. The source and drain electrodes 120 and 122 functions as an etching mask. A remaining portion of the impurity-doped amorphous silicon pattern 115c (FIG. 7B) are defined as an ohmic contact layer 115b. The active layer 115a and the ohmic contact layer 115b are defined as a semiconductor layer 115. The gate electrode 103, the gate insulating layer 110, the semiconductor layer 115 including the active layer 115a and the ohmic contact layer 115b, the source electrode 120 and the drain electrode 122 constitute a switching TFT Tr in the switching region TrA. Although not shown, the same process is performed on the non-display region NA such that a driving ohmic contact layer is formed under the driving source electrode and the driving drain electrode. The driving gate electrode, the gate insulating layer 110, the driving active layer, the driving ohmic contact layer, the driving source electrode and the driving drain electrode constitute a driving TFT in the non-display region NA.

In FIGS. 7B and 7C, the semiconductor layer 115, the source electrode 120 and the drain electrode 122 are formed by two mask processes. However, the semiconductor layer 115, the source electrode 120 and the drain electrode 122 can be formed by a single mask process. The single mask process is performed as below. After the gate insulating layer is formed, the intrinsic amorphous silicon layer, the impurity-doped amorphous silicon layer, and the second metal layer are sequentially deposited. Then, the second metal layer, the impurity-doped amorphous silicon layer and the intrinsic amorphous silicon layer are patterned using a refractive exposing method or a half-tone exposing method. In the refractive exposing method or the half-tone exposing method, PR patterns having different thickness are used. In this case, a semiconductor pattern of the same material as the semiconductor layer is disposed under the data line and the data pad electrode.

Figure 7D:
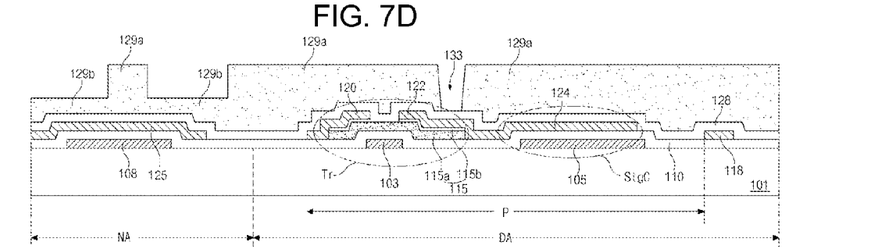

Next, in FIG. 7D, a first passivation layer 128 is formed on the data line 118, the source and drain electrodes 120 and 122, the second storage electrode 124, the data link line, the data pad electrode, the gate link line 125, the gate pad electrode and the driving source and drain electrodes by depositing an inorganic insulating material, such as silicon oxide and silicon nitride. The first passivation layer 128 is not formed on the gate and data pad electrodes due to a shadow frame such that the gate and data pad electrodes are exposed.

Next, an organic insulating layer (not shown) is formed on the first passivation layer 128 by coating an organic insulating material, such as photoacryl and benzocyclobutene (BCB). The organic insulating layer has a thickness of about 3 to about 5 micrometers and a flat top surface. The organic insulating layer is developed using a refractive exposing method or a half-tone exposing method to form a first organic insulating pattern 129a, a second organic insulating pattern 129b and a buffer pattern 131. The first organic insulating pattern 129a is positioned in display region DA and has a thickness of about 3 to about 5 micrometers. The buffer pattern 131 is positioned in a portion, where an end of an electrophoretic film will be disposed, of the non-display region NA. The buffer pattern 131 has a thickness of about 3 to about 5 micrometers and a width of about 0.5 to about 1 mm. The second organic insulating pattern 129b is positioned in other portions of the non-display region NA and has a thickness of about 1 micrometer. Namely, the second organic insulating pattern 129b has a smaller thickness than the first organic insulating pattern 129a and the buffer pattern 131.

In addition, the organic insulating layer is patterned to form a first hole 133 exposing a portion of the first passivation layer 128 and corresponding to the drain electrode 122 of the switching TFT Tr. Although not shown, a second hole exposing a portion of the first passivation layer 128 and corresponding to the driving drain electrode is formed in the non-display region NA.

Figure 7E:
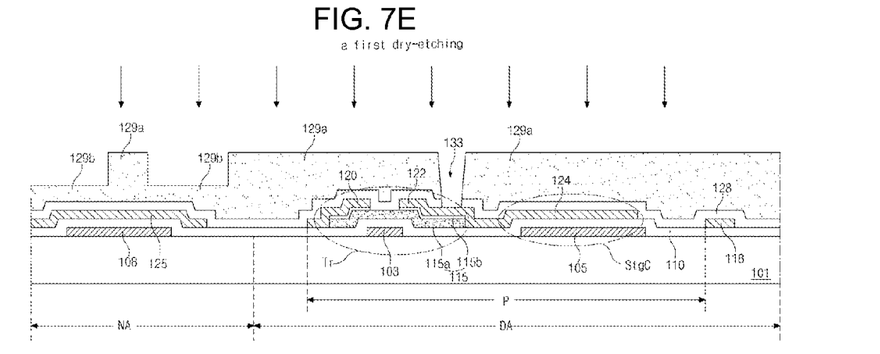

Next, in FIG. 7E, a first dry-etching process is performed under a first gas condition onto the substrate 101, where the first and second organic insulating patterns 129a and 129b and the buffer pattern 131 are formed and portions of the first passivation layer 128 are exposed through a drain contact hole 133 and the second hole (not shown). As a result, the drain contact hole 133 exposing the drain electrode 122 in the switching region TrA and a first contact hole (not shown) exposing the driving drain electrode in the non-display region NA are formed.

Figure 7F:
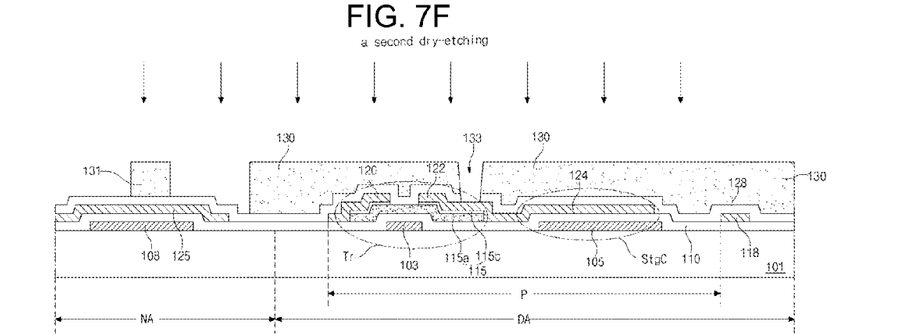

Next, in FIG. 7F, a second dry-etching process is performed under a second gas condition onto the substrate 101 after the first dry-etching process to removed the second organic insulating pattern 129b (of FIG. 7E) in the non-display region NA. At the same time, a thickness of the first organic insulating pattern 129a (of FIG. 7E) in the display region DA is reduced. The first organic insulating pattern 129a (of FIG. 7E) having the reduced thickness is defined as a second passivation layer 130 having a thickness of about 2 to about 4 micrometers. In addition, a thickness of the buffer pattern 131 is also reduced. The buffer pattern 131 has a thickness of about 2 to about 4 micrometers. Moreover, the gate and data pad electrodes (not shown) are exposed by the second dry-etching process.

The second passivation layer 130, which is formed of an organic insulating material and has a thickness of about 2 to about 4 micrometers, is formed to minimize a parasitic capacitance between each of the gate and data lines and a pixel electrode, which will be formed to overlap each of the gate and data lines, and provide a flat top surface.

The second organic insulating pattern 129b (of FIG. 7E) in the non-display region NA is removed to improve an electrical connection between adjacent driving TFTs in the non display region NA. If there is the second passivation layer in the non-display region NA, a contact hole is required in the second passivation layer to expose the driving source electrode and the driving drain electrode. Unfortunately, since each of the driving source electrode and the driving drain electrode has very small size, the contact hole also has very small size. A connection pattern for connecting adjacent driving TFTs is formed in the contact hole. However, since the contact hole has very small size, there is a problem of disconnection in the connection pattern. Namely, the adjacent TFTs are not electrically connected to each other. Since the drain contact hole 133 has a relatively great size, there is no problem in the second passivation layer 130 in the display region DA.

In addition, if there is the second passivation layer on an entire surface of the non-display region NA, there is a problem in a cutting process of the substrate 101 because the second passivation layer has a relatively great thickness. Accordingly, there is no second passivation layer in the non-display region NA.

Even though the buffer pattern 131 of an organic insulating material having a flexible property is formed in the non-display region NA, there is no problem in the cutting process of the substrate 101 because the buffer pattern 131 is adjacent to the display region DA and has a width of about 0.5 to about 1 mm.

Figure 7G:
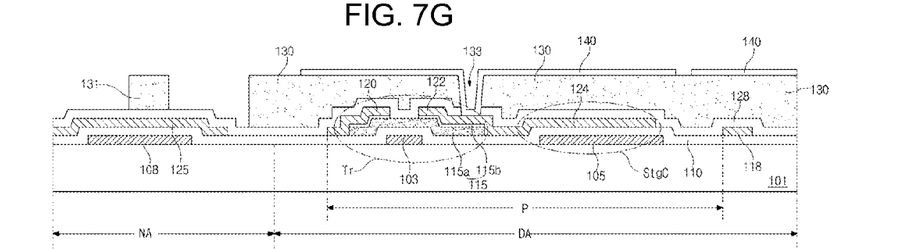

Next, in FIG. 7G, a transparent conductive material layer (not shown) is formed on the second passivation layer 130 by depositing a transparent conductive material, such as indium-tin-oxide (ITO) and indium-zinc-oxide (IZO). The transparent conductive material layer is patterned to form a pixel electrode 140. The pixel electrode 140 is connected to the drain electrode 122 of the switching TFT Tr through the drain contact hole 133 and perfectly overlaps the gate line (not shown) and the data line 118 which are connected to the switching TFT Tr. The pixel electrode 140 also overlaps the switching TFT Tr.

An aperture ratio of the device is maximized by overlapping the gate line and the data line 118 with pixel electrode 140. A parasitic capacitance is generated between the pixel electrode 140 and each of the overlapped gate line and the data line 118. However, since the second passivation layer 130 is formed of an organic insulating material and has a relatively great thickness of about 2 to about 4 micrometers, the parasitic capacitance is minimized.

The transparent conductive material layer in the non-display region NA is also patterned to form a connection pattern (not shown) connecting adjacent driving TFTs in the non-display region NA through a contact hole (not shown) in the first passivation layer 128. At the same time, an auxiliary gate pad electrode (not shown) and an auxiliary data pad electrode (not shown) are respectively formed on the gate pad electrode (not shown) and the data pad electrode (not shown).

Figure 7H:
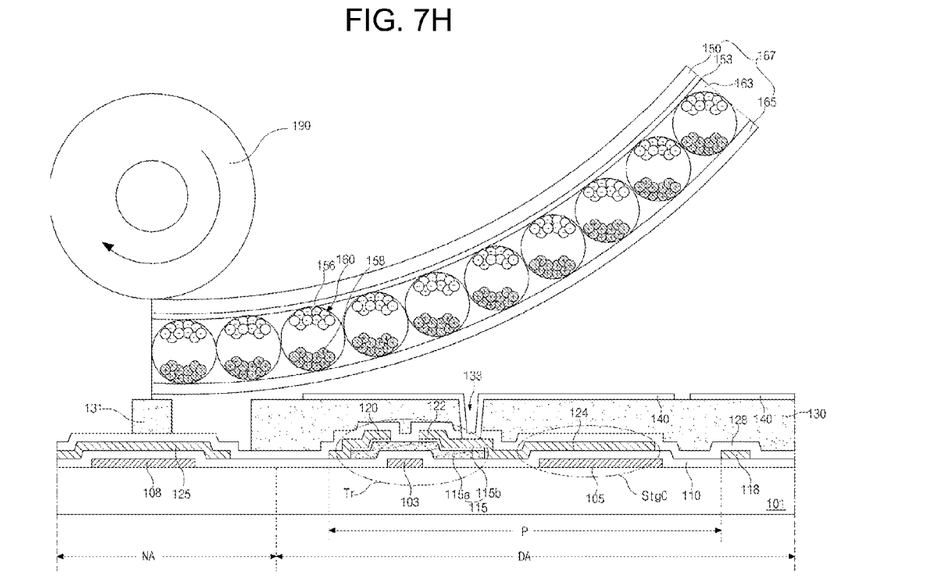
Figure 7I:
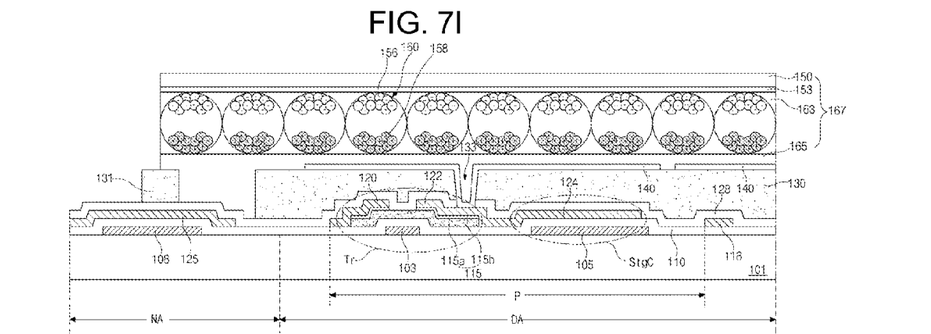

Next, in FIGS. 7H and 7I, the substrate 101, where the pixel electrode 140 is formed in each pixel region P, is disposed on a stage (not shown) of a laminating apparatus. An electrophoretic film 167 including a base film 150, an ink layer 163, an adhesive layer 165 and a common electrode 153 is disposed over the substrate 101. The adhesive layer 165 of the electrophoretic film 167 faces the pixel electrode 140 of the substrate 101. The white-dyed and black-dyed particles 156 and 158 are negatively and positively charged, respectively. The adhesive layer 165 is disposed under the ink layer 163 and formed of a transparent material. The base film 150 is formed of a transparent and flexible material, such as polyethylene terephthalate (PET). The common electrode 153 is disposed between the ink layer 163 and the base film 150 and formed of a transparent conductive material. As a result, the ink layer 163 is positioned between the common electrode 153 and the pixel electrode 140.

The electrophoretic film 167 is aligned such that an end of the electrophoretic film 167 is positioned over the buffer pattern 131 in the non-display region NA of the substrate 101. A roll 190 is aligned to be positioned at an end of the electrophoretic film 167. Namely, the roll 190 is disposed over the buffer pattern 131. The roll 190 is rotated along a direction toward the other end of the electrophoretic film 167 with a pre-determined pressure such that the electrophoretic film 167 is attached onto the substrate 101.

When a laminating process is performed to attach the electrophoretic film 167 onto the substrate 101, an initial contact point of the electrophoretic film 167 and the substrate 101 is disposed on the buffer pattern 131 of an organic insulating material having an elasticity property. Accordingly, an impact of the roll 190 onto the gate link line 125, electrodes of the driving TFTs (not shown) and the gate insulating layer is reduced such that defects, for example, cracks, are not generated.

A black-and-white electrophoretic display device is fabricated by the above process in FIGS. 7A to 7I. A process in FIGS. 7J and 7K is required to form a color electrophoretic display device.

Figure 7J:
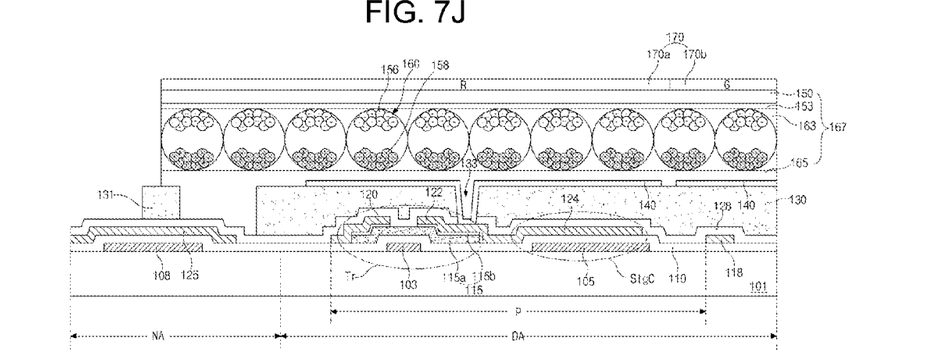

In FIG. 7J, a color filter layer 170 including a red color filter pattern 170a, a green color filter pattern 170b and a blue color filter pattern (not shown) is formed on the electrophoretic film 167. The color filter layer 170 contacts the base film 150. In more detail, a red color filter layer (not shown) is formed on the base film 150 by coating red color resist. The color resist may be coated by a spin coating method. The red color filter layer is exposed using a mask having a transmissive portion having a high transmittance and a blocking portion having a low transmittance for blocking light. The exposed red color filter layer is developed such that the red color filter pattern 170a corresponding to some of the pixel regions P is formed. Since the red color resist has a negative property, a portion, where light is irradiated through the transmissive portion of the mask, of the red color filter layer remains to form the red color filter pattern 170a, while a portion, where light is not irradiated because of the blocking portion of the mask, of the red color filter layer is removed.

Sequentially, the green color filter pattern 170b and the blue color filter pattern (not shown) are formed by the same method for the red color filter pattern 170a. The red color filter pattern 170a, the green color filter pattern 170b and the blue color filter pattern are alternately arranged with each other. The color filter layer 170 may be formed by an inkjet apparatus.

Figure 7K:
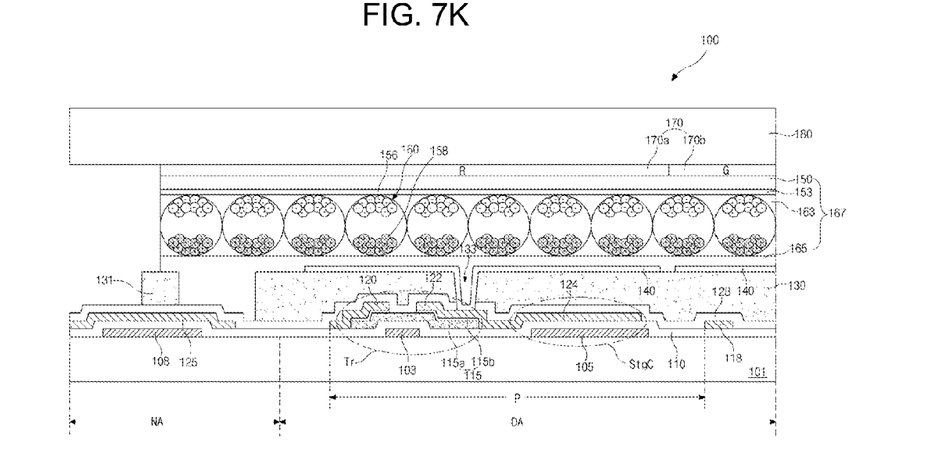

Next, in FIG. 7K, a counter substrate 180 is disposed over the color filter layer 170. The counter substrate 180 is formed of a transparent and flexible plastic material. A seal pattern (not shown) is formed along edges of the non-display region NA. And then, the counter substrate 180 and the array substrate 101 are attached with each other such that the display region DA of the array substrate 101 is covered with the counter substrate 180. The auxiliary gate pad electrode (not shown) and the auxiliary data pad electrode (not shown) are exposed after the counter substrate 180 is attached with the array substrate 101. If the counter substrate 180 has a film type, the counter substrate 180 can be attached onto the electrophoretic film 167 or the color filter layer 170 suing an adhesive layer (not shown). In this case, the seal pattern may be omitted.

In the above processes, the color filter layer 170 is formed on the electrophoretic film 167. However, the color filter layer may be formed on a surface of the counter substrate 180, and then the counter substrate 180, where the color filter layer is formed, is attached with the array substrate 101.

Figure 8:
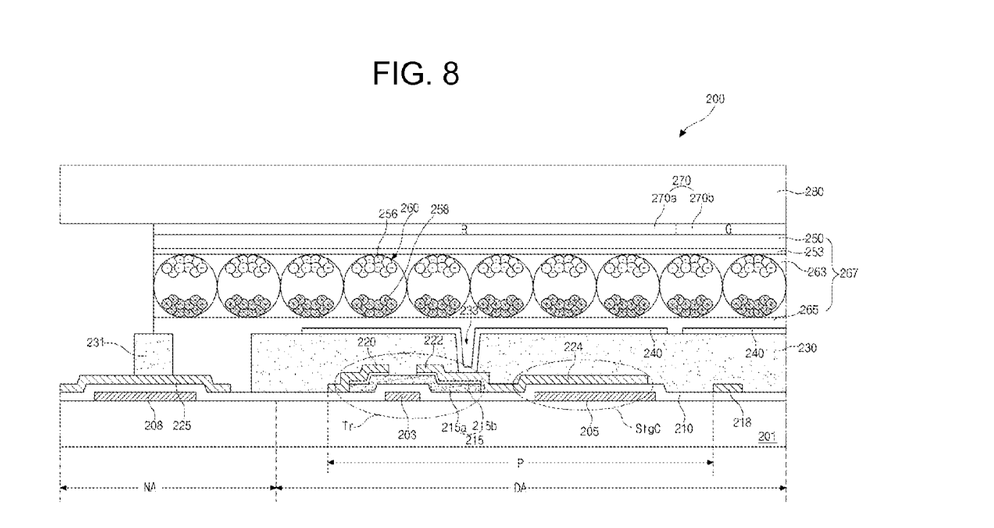
FIG. 8 is a cross-sectional view of an electrophoretic display device according to the present invention.

FIG. 8 is a cross-sectional view of an electrophoretic display device according to the present invention. With comparison to the electrophoretic display device in FIG. 6, the electrophoretic display device 200 in FIG. 5 has a single passivation layer of an organic insulating material. Namely, the single passivation layer of an organic insulating material directly contacts an upper element of a TFT.

As shown in FIG. 8, an electrophoretic display device 200 includes an array substrate 201 and an electrophoretic film 267 attached on the array substrate 201. The array substrate 201 has a display region DA for displaying images and a non-display region NA at a periphery of the display region DA. A plurality of pixel regions P are defined in the display region DA, and a gate pad region and a data pad region are defined in the non-display region NA.

In the display region DA, a plurality of gate lines (not shown) and a plurality of data lines 218 are formed with a gate insulating layer 210 therebetween. The gate lines and the data lines 218 cross each other such that the pixel regions P are defined in the display region DA. In the non-display region NA, a gate link line 225 connected to the gate line through a link contact hole (not shown), a gate pad electrode (not shown) at an end of the gate link line 225, a data link line (not shown) connected to the data line 218, a data pad electrode (not shown) at an end of the data link line, a common connection line 208 for applying a common voltage to a plurality of common lines (not shown) in the display region DA, and a low gate voltage line (not shown) for applying a low gate voltage are formed.

The common lines and the common connection line 208 are disposed at the same layer, and the common lines are branched from the common connection line 208. The common lines and the common connection line 208 are formed of the same material and at the same layer as the gate line. On the other hand, the gate link line 225 crosses the common connection line 208. Accordingly, the gate link line 225 is formed at a different layer than the gate line to prevent an electrical shortage with the common connection line 108. The gate link line 225 formed on the gate insulating layer 210. Since the data line 218 are formed of a different layer than the common connection line 208, an electrical shortage between the data link line and the common connection line 208 is not generated. Accordingly, the data link line is formed at the same layer as the data line 218.

A thin film transistor (TFT) Tr as a switching element is formed in each pixel region P. The TFT connected to the gate line and the data line 218 includes a gate electrode 203, the gate insulating layer 210, a semiconductor layer 215 including an active layer 215a of intrinsic amorphous silicon and an ohmic contact layer 215b of impurity-doped amorphous silicon, a source electrode 220 and a drain electrode 222. Although not shown, a plurality of driving TFTs for driving an electrostatic preventing circuit are formed in the non-display region NA.

The common line is formed in each pixel region P and disposed under the gate insulating layer 210. The common line is parallel to the gate line. The drain electrode 222 extends to overlap a portion of the common line. An overlapped portion of the common line serves as a first storage electrode 205, an overlapped portion of the drain electrode 222 severs as a second storage electrode 224, and the gate insulating layer 210 between the first and second storage electrodes 205 and 224 serves as a dielectric material layer. As a result, a storage capacitor StgC including the first and second storage electrodes 205 and 224 and the gate insulating layer 210 are formed.

A passivation layer 230 of an organic insulating material is formed on the TFTs Tr in the display region DA. The passivation layer 230 has a thickness of about 2 to about 4 micrometers. A drain contact hole 233 exposing the drain electrode 222 of the TFT Tr in each pixel region P is formed through the passivation layer 230.

A buffer pattern 231 of the same material as the passivation layer 230 is formed in the non-display region NA. The buffer pattern 231 also has a thickness of about 2 to about 4 micrometers. The buffer pattern 231 is positioned at a start portion of the electrophoretic film 267 such that an impact resulted from a roll during the film laminating process is diminished. The buffer pattern 231 has an enough width considering an align margin of the film laminating process. Since the align margin is below 0.5 mm, the buffer pattern 231 has a width of about 0.5 to about 1 mm. FIG. 8 shows the buffer pattern 231 spaced apart from the passivation layer 230. However, the buffer pattern 231 can be extended from the passivation layer 230. In addition, the buffer pattern 231 may have an island shape. The island shape buffer pattern 231 may correspond to the gate link line 225 or a space between adjacent gate link lines 225.

Since the buffer pattern 231 is formed of an organic insulating material having a flexible property, an impact resulted from a roll during the film laminating process is diminished such that defects, for example, cracks, on the gate link line 225, an electrode of the driving TFT (not shown), and the gate insulating layer 210 are not generated. In addition, even if there are particles on the electrophoretic film 267, there is no damage on the gate link line 225 because of the buffer pattern 231 has a relatively high thickness and a flexible property. Accordingly, an electrical shortage problem between the gate link line and the common connection line is not generated.

The electrophoretic film 267 is attached on the array substrate 201. The electrophoretic film 267 includes a base film 250, an ink layer 263, an adhesive layer 265 and a common electrode 253. The ink layer 263 includes a plurality of capsules 260, and each capsule 260 has a plurality of white-dyed particles 256 and a plurality black-dyed particles 258 therein. The white-dyed and black-dyed particles 256 and 258 are negatively and positively charged, respectively. The adhesive layer 165 is disposed under the ink layer 263 and formed of a transparent material. The common electrode 253 is disposed between the ink layer 263 and the base film 250 and formed of a transparent conductive material.

A color filter layer 270 including a red color filter pattern 270a, a green color filter pattern 270b and a blue color filter pattern (not shown) is disposed over the electrophoretic film 267. In addition, a protective substrate 280 is formed on the color filter layer 270.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electrophoretic display device, comprising:
a first substrate having a display region and a non-display region at a periphery of the display region, the display region including a pixel region, and the non-display region including first and second portions;
gate and data lines on the first substrate and in the display region, the gate and data lines crossing each other to define the pixel region;
a gate link line connected to the gate line and positioned in the non-display region;
a thin film transistor connected to the gate and data lines and positioned in the pixel region, the thin film transistor including a gate electrode, a gate insulating layer, a semiconductor layer, a source electrode and a drain electrode;
a passivation layer of an organic insulating material over the thin film transistor and in the display region, the passivation layer having a first thickness and including a drain contact hole exposing the drain electrode;
a buffer pattern formed of the same material and having the same thickness as the passivation layer, the buffer pattern positioned in the non-display region;
a pixel electrode positioned in the pixel region and on the passivation layer, the pixel electrode connected to the drain electrode through the drain contact hole; and
an electrophoretic film on the pixel electrode and covering an entire surface of the display region, an end of the electrophoretic film positioned on the buffer pattern,
wherein the buffer pattern is disposed in the first portion except the second portion.

2. The device according to claim 1, wherein the electrophoretic film includes an adhesive layer facing the pixel electrode, an ink layer on the adhesive layer and including a plurality of capsules, a common electrode on the ink layer and of a transparent conductive material, and a base film on the common electrode, and wherein each capsule includes a plurality of white-dyed particles and a plurality black-dyed particles.

3. The device according to claim 1, further comprising a color filter layer, which is positioned on the electrophoretic film and includes red, green and blue color filter patterns in the pixel region, and a second substrate on the color filter layer.

4. The device according to claim 1, further comprising another passivation layer of an inorganic insulating material between the passivation layer and the thin film transistor, wherein the passivation layer of an inorganic insulating material covers the display region and the non-display region.

5. The device according to claim 4, wherein the another passivation layer includes third and fourth portions in the non-display region, and the third portion except the fourth portion is covered with the buffer pattern.

6. The device according to claim 4, wherein the another passivation layer has a second thickness smaller than the first thickness.

7. The device according to claim 1, further comprising a first storage electrode under the gate insulating layer and a second storage electrode on the gate insulating layer, wherein the first storage electrode overlaps the second storage electrode to form a storage capacitor in the pixel region.

8. The device according to claim 1, further comprising:
   a gate pad electrode connected to an end of the gate line and positioned in the non-display region;
   a data link line connected to the data line and positioned in the non-display region;
   a data pad electrode connected to an end of the data line and positioned in the non-display region; and
   a driving thin film transistor for driving an electrostatic preventing circuit and positioned in the non-display region.

9. The device according to claim 8, further comprising a common connection line formed of the same material and the same layer as the gate line and positioned in the non-display region, wherein the gate link line crosses the common connection line and positioned on the gate insulating layer.

10. The device according to claim 1, wherein the first thickness is about 2 to about 4 micrometers, and a width of the buffer pattern is about 0.5 to about 1 millimeter.

11. The device according to claim 1, wherein the buffer pattern extends from the passivation layer.

12. The device according to claim 1, wherein the pixel electrode overlaps the thin film transistor, the gate line and the data line.

* * * * *